(12) United States Patent
Cohen et al.

(10) Patent No.: US 10,803,399 B1
(45) Date of Patent: *Oct. 13, 2020

(54) TOPIC MODEL BASED CLUSTERING OF TEXT DATA WITH MACHINE LEARNING UTILIZING INTERFACE FEEDBACK

(71) Applicant: EMC Corporation, Hopkinton, MA (US)

(72) Inventors: Raphael Cohen, Beer-Sheva (IL); Alon J. Grubshtein, Lehavim (IL); Ofri Masad, Beer-Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 786 days.

This patent is subject to a terminal disclaimer.

(21) Appl. No.: 14/850,195

(22) Filed: Sep. 10, 2015

(51) Int. Cl.
 *G06N 20/00* (2019.01)
 *G06F 16/93* (2019.01)

(52) U.S. Cl.
 CPC ............ *G06N 20/00* (2019.01); *G06F 16/93* (2019.01)

(58) Field of Classification Search
 None
 See application file for complete search history.

(56) References Cited

U.S. PATENT DOCUMENTS

| | | | |
|---|---|---|---|
| 7,765,212 B2 | 7/2010 | Surendran et al. | |
| 7,912,847 B2 | 3/2011 | Lagad et al. | |
| 8,396,741 B2 | 3/2013 | Kannan et al. | |
| 8,458,115 B2 | 6/2013 | Cai et al. | |
| 8,645,395 B2 | 2/2014 | Mushtaq et al. | |
| 8,719,302 B2 | 5/2014 | Bailey et al. | |
| 8,738,361 B2 | 5/2014 | Gryc et al. | |
| 9,672,279 B1* | 6/2017 | Cohen | G06F 17/30713 |
| 2003/0204484 A1* | 10/2003 | Charpiot | G06F 16/35 |
| 2004/0088308 A1* | 5/2004 | Bailey | G06F 16/355 |

(Continued)

OTHER PUBLICATIONS

Cohn, D. et al., "Semi-supervised clustering with user feedback," Constrained Clustering: Advances in Algorithms, Theory, and Applications, vol. 4, No. 1 (2003) pp. 17-32.*

(Continued)

*Primary Examiner* — Kakali Chaki
*Assistant Examiner* — Brian M Smith
(74) *Attorney, Agent, or Firm* — Ryan, Mason & Lewis, LLP

(57) ABSTRACT

An apparatus comprises a processing platform configured to implement a machine learning system for automated classification of documents comprising text data of at least one database. The machine learning system comprises a clustering module configured to assign each of the documents to one or more of a plurality of clusters corresponding to respective topics identified from the text data in accordance with at least one topic model, and an interface configured to present portions of documents assigned to a particular one of the clusters by the clustering module and to receive feedback regarding applicability of the corresponding topic to each of one or more of the presented portions on a per-portion basis. The topic model is updated based at least in part on the received feedback. The feedback may comprise, for example, selection of a confidence level for applicability of the topic to a given one of the presented portions.

20 Claims, 8 Drawing Sheets

(56) References Cited

U.S. PATENT DOCUMENTS

| | | | |
|---|---|---|---|
| 2007/0279490 A1* | 12/2007 | Zhou | G06K 9/00771 348/143 |
| 2009/0043797 A1 | 2/2009 | Dorie et al. | |
| 2011/0136542 A1 | 6/2011 | Sathish | |
| 2013/0081056 A1* | 3/2013 | Hu | G06F 16/35 719/313 |
| 2013/0097167 A1 | 4/2013 | St. Jacques, Jr. et al. | |
| 2013/0211880 A1 | 8/2013 | Kannan et al. | |
| 2014/0101086 A1 | 4/2014 | Lu et al. | |
| 2014/0278754 A1* | 9/2014 | Cronin | G06F 17/30539 705/7.29 |
| 2016/0026491 A1* | 1/2016 | Razin | G06F 9/45558 718/1 |
| 2016/0301771 A1* | 10/2016 | Choudhari | H04L 67/327 |
| 2017/0032251 A1* | 2/2017 | Podgorny | G06N 5/022 |
| 2017/0032440 A1* | 2/2017 | Paton | G06Q 30/0625 |
| 2017/0293625 A1* | 10/2017 | Nachlieli | G06K 9/6215 |

OTHER PUBLICATIONS

Donmez, P. et al., "Proactive learning: cost-sensitive active learning with multiple imperfect oracles," Proc. of the 17th ACM Conf. on Information and Knowledge Management (2008) pp. 619-628.*

Sista, S. et al., "An algorithm for unsupervised topic discovery from broadcast news stories," Proc. of the 2nd Intl. Conf. on Human Language Technology Research (2002) pp. 110-114.*

Wang, D. et al., "Semi-supervised latent dirichlet allocation and its application for document classification," Proc. of the 2012 IEEE/WIC/ACM Intl. Joint Conf. on Web Intelligence and Intelligent Agent Technology, vol. 3 (2012) pp. 306-310.*

Balasubramanyan, R. et al., "From topic models to semi-supervised learning: biasing mixed-membership models to exploit topic-indicative features in entity clustering," Joint European Conf. on Machine Learning and Knowledge Discovery in Databases (2013) pp. 628-642.*

Xie, P. et al., "Integrating document clustering and topic modeling," downloaded from arxiv.org <arxiv.org/abs/1309.6874>, posted Sep. 26, 2013, 10 pp.*

Leng, B. et al., "3D Object retrieval with multitopic model combining relevance feedback and LDA model," IEEE Trans. on Image Processing, vol. 24, No. 1 (Jan. 2015) pp. 94-105 (Year: 2015).*

Huang, Y. et al., "Text clustering with extended user feedback," ACM SIGR (2006) 8pp. (Year: 2006).*

Whang, J. J. et al., "Non-exhaustive, overlapping k-means" Proc. of the 2015 SIAM Intl. Conf. on Data Mining (2015) pp. 936-944. (Year: 2015).*

J. Chuang et al., "Termite: Visualization Techniques for Assessing Textual Topic Models," Proceedings of the ACM International Working Conference on Advanced Visual Interfaces (AVI), May 2012, pp. 74-77, Capri Island, Naples, Italy.

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.

R. Cohen, "Towards Understanding of Medical Hebrew," Thesis, Ben-Gurion University of the Negev, Nov. 2012, 127 pages.

D.M. Blei et al., "Latent Dirichlet Allocation," Journal of Machine Learning Research, Jan. 2003, pp. 993-1022, vol. 3.

A.K. McCallum, "Mallet: A Machine Learning for Language Toolkit," 2002, 2 pages.

H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.

P.F. Brown et al., "Class-Based n-gram Models of Natural Language," Association for Computation Linguistics, 1992, pp. 467-479, vol. 18, No. 4.

S. Banerjee et al., "The Design, Implementation and Use of the Ngram Statistics Package," Proceedings of the 4th International Conference on Computational Linguistics and Intelligent Text Processing (CICLing), 2003, pp. 370-381.

A. Nenkova et al., "The Impact of Frequency on Summarization," Microsoft Research, Tech. Rep. MSR-TR-2005-101, Jan. 2005, 8 pages.

H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.

J.M. Conroy et al., "CLASSY Query-Based Multi-Document Summarization," Proceedings of the 2005 Document Understanding Workshop, Oct. 2005, 9 pages.

T. Baumel et al., "Query-Chain Focused Summarization," Proceedings of the 52nd Annual Meeting of the Association for Computational Linguistics, Jun. 2014, pp. 913-922, vol. 1.

G. Erkan et al., "LexRank: Graph-Based Lexical Centrality as Salience in Text Summarization," Journal of Artificial Intelligence Research, Dec. 2004, pp. 457-479, vol. 22.

U.S. Appl. No. 14/501,407 filed in the name of R. Cohen et al. filed Sep. 30, 2014 and entitled "Automated Content Inference System for Unstructured Text Data."

U.S. Appl. No. 14/501,431 filed in the name of R. Cohen et al. filed Sep. 30, 2014 and entitled "Cluster Labeling System for Documents Comprising Unstructured Text Data."

U.S. Appl. No. 14/670,810 filed in the name of R. Cohen et al. filed Mar. 27, 2015 and entitled "Analysis and Visualization Tool with Combined Processing of Structured and Unstructured Service Event Data."

* cited by examiner

FIG. 7

Topics: domain/password ▼

⊕ Load sentences

☑ Submit corrections    Review Tuning Results

Representative sentences:

Show [25 ▼] entries                                                                 Search: [          ]

| name | ▲ exclude |  |
|---|---|---|
| need assistance with my other desktop workstation | ⊘ | Not sure ▼ |
| no fixed seat | ⊘ | Not sure ▼ |
| no work around available so increasing the urgency | ⊘ | Not sure ▼ |
| not able to login on the network assisted and provided the password | ○ | |
| not able to login only if connected to the docking station | ○ | |
| nothing worked for the user | ⊘ | Not sure ▼ |
| now requested user to login | ○ | |
| nt password reset | ○ | |
| other colleagues are able to connect to the network | ⊘ | 6.network connectivity ▼ |
| other users are also not able to get in though that laptop | ⊘ | 6.network connectivity ▼ |
| outlook asking for password rebooted system – outlook connected to ms exchange and updated successfully issue resolved user all set | ○ | |
| outlook asking for password user is connected to lan cable in the office own working fine logged off/logged back into the system | ○ | |
| outlook working fine now user all set | ○ | |
| passed the password to the user | ○ | |
| pc needs to be reimaged unable to log on to pc, it needs to put back on corp domain and restored | ○ | |
| please add the laptop to the corp domain | ○ | |
| please assist user to login windows | ○ | |
| please check the system as it is a new pc with the windows so it may not be on the domain | ⊘ | Not sure ▼ |
| please check the system as it is an emc system | ⊘ | Not sure ▼ |
| please close this chat window only once your session is complete | ⊘ | Not sure ▼ |
| please help to add again | ○ | |
| please help to upgrade windows xp | ⊘ | Not sure ▼ |
| please help user to log in windows | ○ | |
| please let me know when can i come down to emc office as most of the times i work remote | ⊘ | Not sure ▼ |
| please send out the apex local it tech | ⊘ | Not sure ▼ |
| problem with outlook keep asking for password even when the computer is connected to emc network | ○ | |

Showing 101 to 125 of 265 entries

Previous 1 ... 4 [5] 6 ... 11 Next

| Topics | | | | |
|---|---|---|---|---|
| drive replacement ▼ | | | | |
| ⊕ Load sentences | | | | |
| ☒ Submit corrections | Review Tuning Result | | | |

Representative sentences

Show [25 ▼] entries    Search: [            ]

| name ▲ | exclude | |
|---|---|---|
| dms process underway | ☑ | Not sure ▼ |
| do health check and no issue found | ☑ | 5.health check ▼ |
| document provided to customer | ☑ | 0.administrative ▼ |
| done disk drive replacement – ok | ☐ | |
| done disk replacement – ok | ☐ | |
| door led ps replaced | ☑ | 7.non drive hw replacement ▼ |
| door led was replaced | ☑ | 7.non drive hw replacement ▼ |
| door light replaced | ☑ | 7.non drive hw replacement ▼ |
| dr test complete | ☑ | Not sure ▼ |
| dr test completed | ☑ | Not sure ▼ |
| drive & sps replacement | ☐ | |
| drive 02d c02 has been replaced | ☐ | |
| drive 08d d/05 has now been replaced | ☐ | |
| drive 09c c/0e is a ready spare drive | ☐ | |
| drive 10a d8 is a nr space that needs to be replaced | ☐ | |
| drive 10b c/06 is a ready spare drive now | ☐ | |
| drive 10b db is actually a ready spare | ☐ | |
| drive 10d c/00 has not failed | ☐ | |
| drive 11a c/06 involved in sparing operation | ☐ | |
| drive 11a ca is a nr hot spare that went through the sparing process and was swapped to drive 7c c0e | ☐ | |
| drive 11a ca ready and is the new location of drive 9c ca after the dms/sparing process | ☐ | |
| drive 11a ca ready and is going through the sparing process once complete the box will create an sr for replacement | ☐ | |

TOPIC MODEL BASED CLUSTERING OF TEXT DATA WITH MACHINE LEARNING UTILIZING INTERFACE FEEDBACK

FIELD

The field relates generally to information processing systems, and more particularly to text data classification in service event analysis and other applications implemented in information processing systems.

BACKGROUND

In many information processing systems, service event analysis relies heavily on inefficient manual activities. For example, it is common in some systems for service personnel to be required to complete forms describing problems experienced by customers and the manner in which these problems were resolved. These forms often utilize static sets of predetermined problem and resolution codes that, in the interest of convenience to the service personnel, tend to be overly general and vague.

Supplementary unstructured text data added to such forms is often ignored as it requires special treatment. For example, the unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide machine learning systems for automated classification of documents comprising text data of at least one database. Such machine learning systems are advantageously configured in some embodiments to provide accurate and efficient clustering of documents comprising text data.

In one embodiment, an apparatus comprises a processing platform configured to implement a machine learning system for automated classification of documents comprising text data of at least one database. The machine learning system comprises a clustering module configured to assign each of the documents to one or more of a plurality of clusters corresponding to respective topics identified from the text data in accordance with at least one topic model, and an interface configured to present portions of documents assigned to a particular one of the clusters by the clustering module and to receive feedback regarding applicability of the corresponding topic to each of one or more of the presented portions on a per-portion basis. The topic model is updated based at least in part on the received feedback.

The text data in some embodiments illustratively comprises unstructured text data such as unstructured service request summaries. For example, the unstructured service request summaries may comprise problem summaries and corresponding solution summaries relating to respective service events.

In some embodiments, the text data of the documents is automatically broken down into sentences for annotation by an analyst or other user via the interface. Accordingly, the presented portions of the documents may comprise sentences or other arrangements of multiple words automatically generated from the text data.

The interface may be configured to permit selection of a particular confidence level for the applicability of the topic to a given one of the presented portions.

Additionally or alternatively, the interface may be configured to permit selection of an alternative topic for a given one of the presented portions. The assignment of the associated document to one or more clusters is then adjusted by the clustering module in accordance with the selection of the alternative topic. The alternative topic may be selected from a listing of a plurality of selectable alternative topics provided for the presented portion by the interface. Numerous other types of feedback can be used.

The machine learning system in some embodiments comprises back end and front end portions, with the back end portion comprising a big data analytics system implementing machine learning functionality of the machine learning system, including at least part of the above-noted clustering module, and the front end portion implementing at least part of the interface.

By way of example, the big data analytics system of the back end portion may comprise a massively parallel processing (MPP) database having an associated library of scalable in-database analytics functions. Also by way of example, the front end portion may comprise a web server implemented utilizing at least one virtual machine.

Illustrative embodiments can provide a number of significant advantages relative to the conventional arrangements described previously. For example, one or more of these embodiments avoid the need for manual screening in which a corpus of unstructured text data is reviewed and sampled by service personnel.

Moreover, the machine learning systems in some embodiments are data driven in that relevant topics are elevated automatically from the actual unstructured text data itself rather than determined by attempting to impose a limited set of predefined themes on the unstructured text data. As a result, there is no need for manual customization and maintenance of a large set of rules that can be used to determine correspondence with predefined themes of interest. For example, illustrative embodiments do not require rule updates to accommodate previously unseen terms appearing in unstructured text data.

These and other illustrative embodiments described herein include, without limitation, apparatus, systems, methods and processor-readable storage media.

BRIEF DESCRIPTION OF THE DRAWINGS

FIGS. 6 through 8 show examples of user interface displays generated by machine learning systems in illustrative embodiments.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
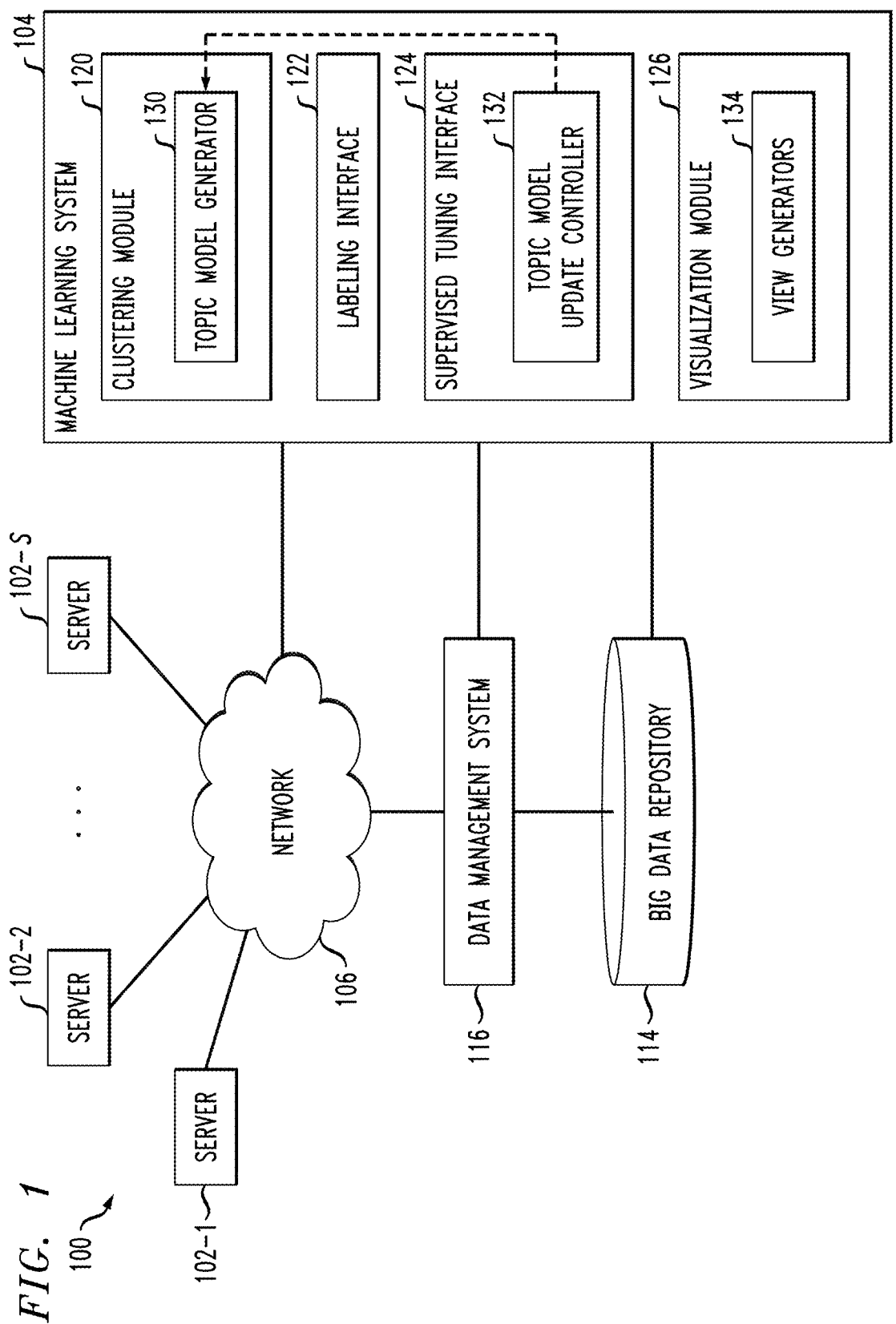
FIG. 1 is a block diagram of an information processing system that includes a machine learning system for automated classification of documents comprising text data of at least one database in an illustrative embodiment of the invention.

FIG. 1 shows an information processing system 100 configured in accordance with an illustrative embodiment of the present invention. The information processing system 100 is assumed to be built on at least one processing platform and in this embodiment illustratively comprises a plurality of servers 102-1, 102-2, . . . 102-S and a machine learning system 104, all of which are coupled to and communicate over a network 106. The machine learning system 104 is advantageously configured for automated classification of documents comprising text data of at least one database. The text data is illustratively provided by at least a subset of the servers 102, which may comprise servers located at respective different data centers or other facilities of a business or other enterprise.

The machine learning system 104 is coupled to a "big data" repository 114 comprising at least one service events database. The big data repository 114 in the present embodiment is assumed to store text data of a potentially large number of documents. The text data may illustratively include both structured and unstructured service event data of the service events database.

It is to be appreciated that the big data repository 114 may comprise a combination of multiple separate databases, such as separate databases for respective structured and unstructured service event data. Such multiple databases may be co-located within a given data center or other facility or geographically distributed over multiple distinct facilities. Numerous other combinations of multiple databases each containing portions of at least one of structured and unstructured service event data can be used in implementing at least portions of the big data repository 114.

The structured service event data illustratively comprises service event data stored in one or more structured data fields of the service events database, and the unstructured service event data illustratively includes documents comprising unstructured text data of the service events database. More particularly, the unstructured service event data in the present embodiment is assumed to comprise unstructured text data in the form of multiple documents each relating to one or more service events arising within the system 100 or within associated systems not explicitly shown.

By way of example, in an embodiment in which the system 100 is implemented by or on behalf of a customer-facing business such as a customer support organization, the structured and unstructured service event data can comprise large amounts of information regarding customer interaction. The structured service event data in this context may comprise structured information about the customer, support personnel involved in each case, locations, dates, times to resolution, product types and problem codes. The unstructured service event data in this context may comprise manual textual information entered by support engineers or help desk assistants. This may include a description of the problem (e.g., a problem summary or problem description), the steps taken to correct the problem (e.g., a resolution summary) or the entire customer interaction (e.g., chat or call transcripts). Numerous other types of structured and unstructured service event data can be used in other embodiments. For example, other types of unstructured service event data may include service request transcripts, trouble tickets, engineering notes, meeting notes, survey responses and social media data.

It is to be appreciated, however, that embodiments of the invention are not limited to processing of service event data, but are instead well-suited for use in processing text data of a variety of different types.

The text data processed by the machine learning system 104 in some embodiments comprises vast amounts of human generated textual content stored in a corporate data lake that is part of the big data repository 114. Such a data lake may be viewed as a type of big data repository as that latter term is used herein.

The big data repository 114 illustratively comprises one or more storage disks, storage arrays, electronic memories or other types of memory, in any combination. Although shown as separate from the machine learning system 104 in FIG. 1, the big data repository 114 in other embodiments can be at least partially incorporated within the machine learning system 104, or within one or more other system components.

The documents stored in the big data repository 114 need not be in any particular format or formats, but generally comprise text data, possibly including unstructured text data stored in combination with other types of data such as structured text data. Moreover, a given set of documents subject to processing in embodiments of the invention can illustratively include documents of a variety of different formats. The term "document" as used herein is therefore intended to be broadly construed. A wide variety of other types of data can be included in or otherwise associated with a given one of the documents in addition to its structured or unstructured text data.

In the present embodiment, the machine learning system 104 and the big data repository 114 are associated with a data management system 116. For example, the storage of data in and the retrieval of data from the big data repository 114 in this embodiment can be controlled at least in part by the associated data management system 116. The machine learning system 104 can communicate directly with the big data repository 114 and the data management system 116, and additionally or alternatively can communicate with these and other system components via the network 106.

It is assumed in the present embodiment that the data management system 116 coordinates storage of text data and other types of data in the big data repository 114, as well provisioning of portions of that data to the machine learning system 104 as needed for processing. It is also possible for the machine learning system 104 to provide data directly to, and retrieve data directly from, the big data repository 114.

At least portions of the data provided for storage in the big data repository 114 can come from one or more of the servers 102 via the data management system 116. Also, visualizations or other related output information can be delivered by the machine learning system 104 to one or more of the servers 102 over network 106 for delivery to other portions of the system 100, such as one or more user devices coupled to the network 106 but not explicitly shown in FIG. 1. Thus, for example, a visualization or other type of machine learning system output can be provided to an application running on a mobile telephone, tablet computer, laptop computer or other type of user device.

The machine learning system 104 in the present embodiment is separated into a plurality of functional modules, including a clustering module 120, a labeling interface 122, a supervised tuning interface 124 and a visualization module 126.

The clustering module 120 operates on text data from the big data repository 114. For example, the clustering module 120 is illustratively configured to assign each of a plurality of documents from the big data repository 114 to one or more of a plurality of clusters corresponding to respective topics identified from the text data of the associated documents in accordance with at least one topic model. The topic model in this embodiment is provided by a topic model generator 130 that is part of the clustering module 120.

Although the clustering module 120 in the FIG. 1 embodiment is shown as being implemented within the machine learning system 104, in other embodiments the clustering module 120 can be implemented at least in part externally to the machine learning system. For example, clustering module 120 can be implemented in a related system, such as a cluster labeling system or a content inference system.

The labeling interface 122 is configured to permit entry of labels for respective ones of the clusters corresponding to respective topics. In other embodiments, label entry for clusters can be fully automated and not controlled by any interface.

The supervised tuning interface 124 is configured to present portions of documents assigned to a particular one of the clusters by the clustering module 120 and to receive feedback regarding applicability of the corresponding topic to each of one or more of the presented portions on a per-portion basis.

In the present embodiment, this feedback from the supervised tuning interface 124 is provided to the topic model generator 130 from a topic model update controller 132 of the supervised tuning interface 124 and utilized to update one or more topic models utilized by the clustering module 120. Accordingly, at least one topic model in the machine learning system 104 is updated based at least in part on feedback received from the supervised tuning interface 124. This feedback is illustratively entered via one or more user display interfaces of the supervised tuning interface 124 by a system user. Examples of such user display interfaces will be described below in conjunction with FIGS. 6, 7 and 8.

The labeling interface 122 and the supervised tuning interface 124 in the present embodiment may be viewed as collectively comprising an example of what is more generally referred to herein as an "interface." Thus, elements 122 and 124 may represent different portions of a single interface, or separate interfaces. Also, a wide variety of other interface arrangements can be used in other embodiments.

The visualization module 126 in the present embodiment comprises view generators 134 configured to generate one or more visualizations that are presented to a system user possibly in conjunction with the one or more user interface displays of the supervised tuning interface 124. For example, a given one of the view generators 134 can be configured to generate a topic view visualization. Such a visualization may include a topic histogram indicating a number of documents for each of a plurality of topics.

Also, a wide variety of additional or alternative view generators can be used in the visualization module 126 in other embodiments, such as, for example, a bigram view generator configured to provide a visualization of a plurality of term pairs from a selected cluster, a summarization view generator configured to provide a visualization of representative term sequences from the selected cluster, and a unigram and aggregate probability view generator configured to provide a visualization of a plurality of individual terms from the selected cluster with the aggregate probability comprising a combination of individual probabilities that respective ones of the terms appear in the selected cluster.

The individual terms may comprise respective words, the term pairs may comprise respective word pairs, and the term sequences may comprise respective sentences each having three or more words. However, other types of terms, term pairs and term sequences can be used in other embodiments. Also, phraseology such as "word" and "sentence" as used herein is intended to be broadly construed, and should not be viewed as requiring strict conformance to particular languages, grammatical constructs, etc.

The above-noted bigram view generator is illustratively configured to order the term pairs from the selected cluster based at least in part on pointwise mutual information (PMI) gain. As a more particular example, the bigram view generator can initially order the term pairs based on PMI gain and then reorder the ordered term pairs based on frequency of occurrence in the selected cluster.

The above-noted summarization view generator is illustratively configured to identify the representative term sequences from the selected cluster using an automatic summarization algorithm. Examples of automatic summarization algorithms that may be used in generating the summarization visualization include SumBasic, BayesSum and Classy.

Additional details regarding these and other exemplary summarization techniques suitable for use in embodiments of the invention are disclosed in, for example, A. Nenkova et al., "The Impact of Frequency on Summarization," MSR-TR-2005-101, 2005; H. Daume et al., "Bayesian Query-Focused Summarization," Proceedings of the 21st International Conference on Computational Linguistics, Sydney, Australia, July 2006, pp. 305-312; J. M. Conroy et al., "CLASSY Query-Based Multi-Document Summarization," Proceedings of the Document Understanding Conf. Wksp. 2005 (DUC 2005) at the Human Language Technology Conf./Conf. on Empirical Methods in Natural Language Processing (HLT/EMNLP); T. Baumel et al., "Query-Chain Focused Summarization," ACL (1) 2014: 913-922; and G. Erkan et al., "LexRank: Graph-based. Lexical Centrality as Salience in Text Summarization," Journal of Artificial Intelligence Research (JAIR) 22.1 (2004): 457-479, which are incorporated by reference herein.

Other types of view visualizations that may be provided by the view generators 134 include structured data field view visualizations, combined topic and structured data field view visualizations, and filtered view visualizations.

In some embodiments, the visualization module 126 is part of an analysis and visualization tool. Such a tool can incorporate other parts of the machine learning system 104. For example, it is possible to implement the machine learning system 104 within an analysis and visualization tool.

Although the interfaces 122 and 124 and visualization module 126 in the FIG. 1 embodiment are shown as being implemented within the machine learning system 104, in other embodiments one or more of these components, like the clustering module 120 as previously indicated, can be implemented at least in part externally to the machine learning system 104. For example, one or more of the interfaces 122 and 124 can be implemented at least in part in a related system, such as the data management system 116 associated with the big data repository 114, or elsewhere in the system 100.

The machine learning system 104 can include additional or alternative components in other embodiments. For example, the machine learning system can include one or more additional modules, such as a preprocessing module for applying preprocessing operations such as data indexing and dictionary generation to unstructured text data. Alternatively, such a preprocessing module can be implemented in a related content inference system that incorporates or is otherwise associated with the machine learning system or a corresponding cluster labeling system.

By way of example, a preprocessing module of the type described above illustratively comprises a data indexer and a dictionary generator.

The data indexer is configured to process unstructured text data of one or more documents obtained from the big data repository 114 in order to construct a term index for at least a given one of the documents. The unstructured text data illustratively comprises unstructured service request summaries, such as problem summaries and corresponding solution summaries, relating to service events. In some embodiments, the unstructured text data has structured data associated therewith in the big data repository 114 and the term index is based on both the unstructured text data and the associated structured data. Examples of structured data include indications of region, team, etc.

The dictionary generator is configured to process one or more term indexes generated by the data indexer in order to construct one or more in-domain dictionaries. In this context, the term "in-domain" refers to a domain comprising specified unstructured text data of one or more documents, although other types of domains can be used in other embodiments. The dictionary generator is illustratively configured to implement automatic lemmatization and synonym extraction, but in other embodiments different types of dictionary generators may be used. Additional details regarding exemplary dictionary generation techniques that may be utilized in embodiments of the present invention can be found in R. Cohen, "Towards Understanding of Medical Hebrew," Dissertation, Ben-Gurion University of the Negev, 2012; P. F. Brown et al., "Class-based n-gram models of natural language," Computational Linguistics 18.4 (1992): 467-479; and S. Banerjee et al., "The design, implementation, and use of the ngram statistics package," Computational Linguistics and Intelligent Text Processing 2003:370-381, which are incorporated by reference herein.

The topic model generator 130 of the clustering module 120 is illustratively configured to process one or more in-domain dictionaries in order to construct at least one topic model. In the present embodiment, it is assumed that the topic model generator 130 in generating the topic model utilizes latent Dirichlet allocation (LDA) with asymmetric priors, although other techniques can be used, including, for example, probabilistic latent semantic analysis (pLSA), canonical-correlation analysis (CCA), or combinations of these and other topic modeling algorithms. The topic model generator 130 illustratively provides lists of topics at least a subset of which are elevated as respective sets of related terms from the unstructured text data.

Examples of topic modeling algorithms suitable for use in the machine learning system 104 in embodiments of the present invention are disclosed in, for example, R. Cohen et al., "Redundancy in electronic health record corpora: analysis, impact on text mining performance and mitigation strategies," BMC Bioinformatics 2013, 14:10; D. M. Blei et al., "Latent dirichlet allocation," The Journal of Machine Learning Research 2003, 3:993-1022; A. K. McCallum, "Mallet: A machine learning for language toolkit," 2002; and H. Wallach et al., "Rethinking LDA: Why priors matter," Advances in Neural Information Processing Systems 2009, 22:1973-1981, which are incorporated by reference herein.

The visualization module 126 is configured to provide an output display showing at least a subset of the various visualizations generated by the view generators 134, as well as any additional or alternative visualizations. The output display illustratively comprises one of a plurality of user interface displays that are generated under the control of the visualization module 126 and presented on a display screen of a user device not explicitly shown in the system 100 of FIG. 1. For example, such a user device may comprise a computer, mobile telephone or other type of processing device adapted for communication with the machine learning system 104 over the network 106.

The visualization module 126 illustratively operates in cooperation with the supervised tuning interface 124 to support tuning functionality in the machine learning system 104 using the above-noted user interface displays.

The big data repository 114 may be updated to indicate the assignment of one or more topics to a given document. Such a topic assignment is an example of what is more generally referred to herein as a "content inference." As mentioned previously, the machine learning system 104 in some embodiments is incorporated in or otherwise associated with a content inference system.

The machine learning system 104 is advantageously data driven in that relevant topics are elevated automatically from the actual unstructured text data itself rather than determined by attempting to impose a limited set of predefined themes on the unstructured text data.

Moreover, the machine learning system 104 in the present embodiment is illustratively configured to automatically break down the text data of the documents into sentences for annotation by an analyst or other user via the interface. Accordingly, the presented portions of the documents may comprise sentences or other arrangements of multiple words automatically generated from the text data.

It is to be appreciated that the particular arrangement of system components illustrated in FIG. 1 is exemplary only, and that numerous other arrangements of components may be used in other embodiments. For example, in other embodiments, functionality described herein as being associated with one or more of the clustering module 120, interfaces 122 and 124 and visualization module 126 may be implemented at least in part using additional or alternative components of the system 100.

The machine learning system 104, and possibly other related components of system 100 such as the big data repository 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The one or more processing devices implementing the machine learning system 104, and possibly other components of system 100, may each further include a network interface that allows such components to communicate with one another over one or more networks. For example, a given such network interface illustratively comprises network interface circuitry that allows at least one of the modules 120, 122, 124 and 126 to communicate over a network with other components of the system 100 such as servers 102, big data repository 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the machine learning system 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 9 and 10.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Examples of other system embodiments will be described below in conjunction with FIGS. 3, 4 and 5.

The operation of the information processing system 100 will now be further described with reference to the flow diagram of FIG. 2, which illustrates an exemplary process carried out by the system 100 in one embodiment. The process as shown includes steps 200 through 208. Steps 200 through 208 are assumed to be performed by the machine learning system 104, but one or more of these steps may be performed at least in part by or in conjunction with other system components in other embodiments. Moreover, automated document classification functionality as disclosed herein should not be viewed as being limited in any way to this particular illustrative arrangement of process steps.

In step 200, documents comprising text data of a database are obtained. For example, the documents in some embodiments illustratively comprise unstructured text data of a service events database of the big data repository 114. Such documents may additionally comprise structured service event data, where such structured service event data illustratively comprises service event data that is stored in one or more structured data fields of the service events database. It is to be appreciated, however, that numerous other types of documents and text data may be used.

As mentioned previously, various preprocessing steps may be applied to the unstructured text data. For example, one or more term indexes may be constructed, possibly in the form of a document term matrix, or in another suitable format. Also, associated structured data may be taken into account in generating the one or more term indexes. One or more in-domain dictionaries may then be constructed based on the term index, possibly using automatic lemmatization and synonym extraction.

In step 202, each of the documents is assigned to one or more clusters corresponding to respective topics identified from the text data in accordance with a topic model. The assignment is illustratively performed by the clustering module 120 utilizing at least one topic model generated by the topic model generator 130. By way of example, a given such topic model can be constructed based on one or more of the above-noted in-domain dictionaries, possibly using LDA with asymmetric priors. Additionally or alternatively, one or more other topic modeling algorithms such as pLSA or CCA may be used.

It is possible in this illustrative embodiment that a given document can be assigned to multiple clusters, such as two or three different clusters. The clusters in this embodiment are therefore examples of what are referred to herein as "soft" clusters. In other embodiments, the machine learning system 104 may be configured in some modes of operation such that each document can only be assigned to a single cluster, resulting in what are referred to herein as "hard" clusters.

In step 204, portions of the documents assigned to a particular one of the clusters are presented via a tuning interface. This tuning interface illustratively comprises the supervised tuning interface 124 of the machine learning system 104. By way of example, at least a subset of the document portions presented via the tuning interface may comprise respective sentences or other arrangements of multiple words, where as noted above terms such as "word" and "sentence" herein are intended to be broadly construed. More particularly, as noted above, the machine learning system 104 is illustratively configured to automatically break down the text data of the documents into sentences for annotation by an analyst or other user via the interface. Other arrangements of arrangements of multiple words can additionally or alternatively be automatically generated from the text data in this manner.

In step 206, feedback is received via the tuning interface regarding applicability of the corresponding topic to each of one or more of the presented portions on a per-portion basis. For example, such feedback may include information indicating a user selection via the tuning interface of a particular confidence level for the applicability of the topic to a given one of the presented portions.

Accordingly, the supervised tuning interface 124 in such an arrangement is configured to permit selection of a particular confidence level for the applicability of the topic to a given one of the presented portions.

Additionally or alternatively, the supervised tuning interface 124 is configured to permit selection of an alternative topic for a given one of the presented portions. In an arrangement of this type, the assignment of the associated document to one or more clusters is adjusted by the clustering module 120 in accordance with the selection of the alternative topic. The alternative topic may be selected from a listing of multiple selectable alternative topics provided for the presented portion by the supervised tuning interface 124.

These and other types of feedback provided via the supervised tuning interface 124 are illustratively provided by one or more analysts, subject matter experts (SMEs) or other system users.

The machine learning system 104 in the present embodiment utilizes such feedback to facilitate the creation of highly accurate topic models for automated classification of documents comprising text data. More particularly, the feedback from the supervised tuning interface 124 is utilized in the machine learning system 104 to improve the unsupervised classification of the documents performed by the clustering module 120. A relatively small amount of such feedback can lead to significant enhancements in the accuracy and efficiency of the automated document classification. Accordingly, considerably better system performance can be achieved with only a minimal investment in analyst hours. The present embodiment thus facilitates unsupervised classification with minimal analyst intervention via the supervised tuning interface 124 to achieve significantly higher levels of performance.

In step 208, the topic model is updated based at least in part on the received feedback. As noted above, such feedback can include information indicating a user selection via the supervised tuning interface 124 of a particular confidence level for the applicability of the topic to a given one of the presented portions. It may additionally or alternatively include selection of an alternative topic for a given one of the presented portions. Such information is illustratively provided by the topic model update controller 132 of the supervised tuning interface 124 to the topic model generator 130 of the clustering module 120 via a feedback path indicated by a dashed line in the FIG. 1 embodiment. The feedback illustratively indicates to the clustering module 120 that the previous assignment of a document to a cluster should be adjusted. Corresponding adjustments are made to the topic model such that the machine learning system 104 learns to improve its topic modeling and associated cluster assignment using the feedback provided via the supervised tuning interface 124.

Examples of user interface displays that may be generated in conjunction with the FIG. 2 process will be described below in conjunction with FIGS. 6 through 8. However, it is to be appreciated that numerous other types of user interface displays may be generated to facilitate automated document classification through supervised tuning in a machine learning system as disclosed herein.

Steps 200 through 208 can be repeated periodically or as needed to process additional documents comprising text data from the big data repository 114.

Figure 2:
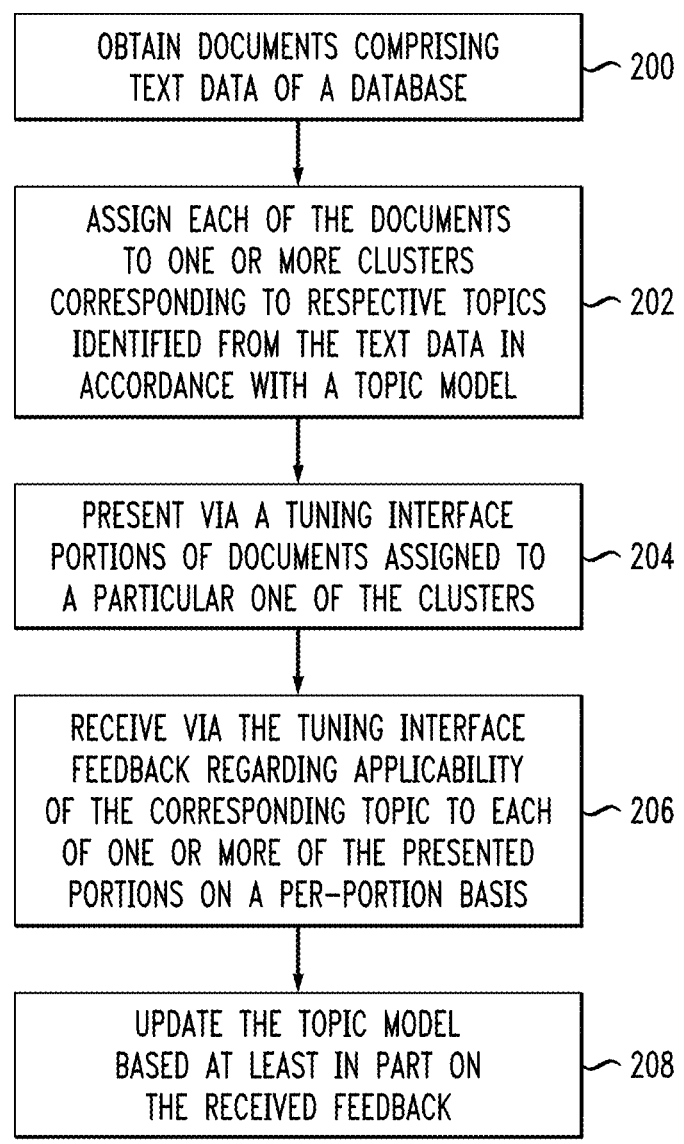
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing a machine learning system or portions thereof. For example, the ordering of the process steps may be varied in other embodiments, or certain steps may be performed concurrently with one another rather than serially.

It is to be appreciated that machine learning functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing a machine learning system as disclosed herein.

Figure 3:
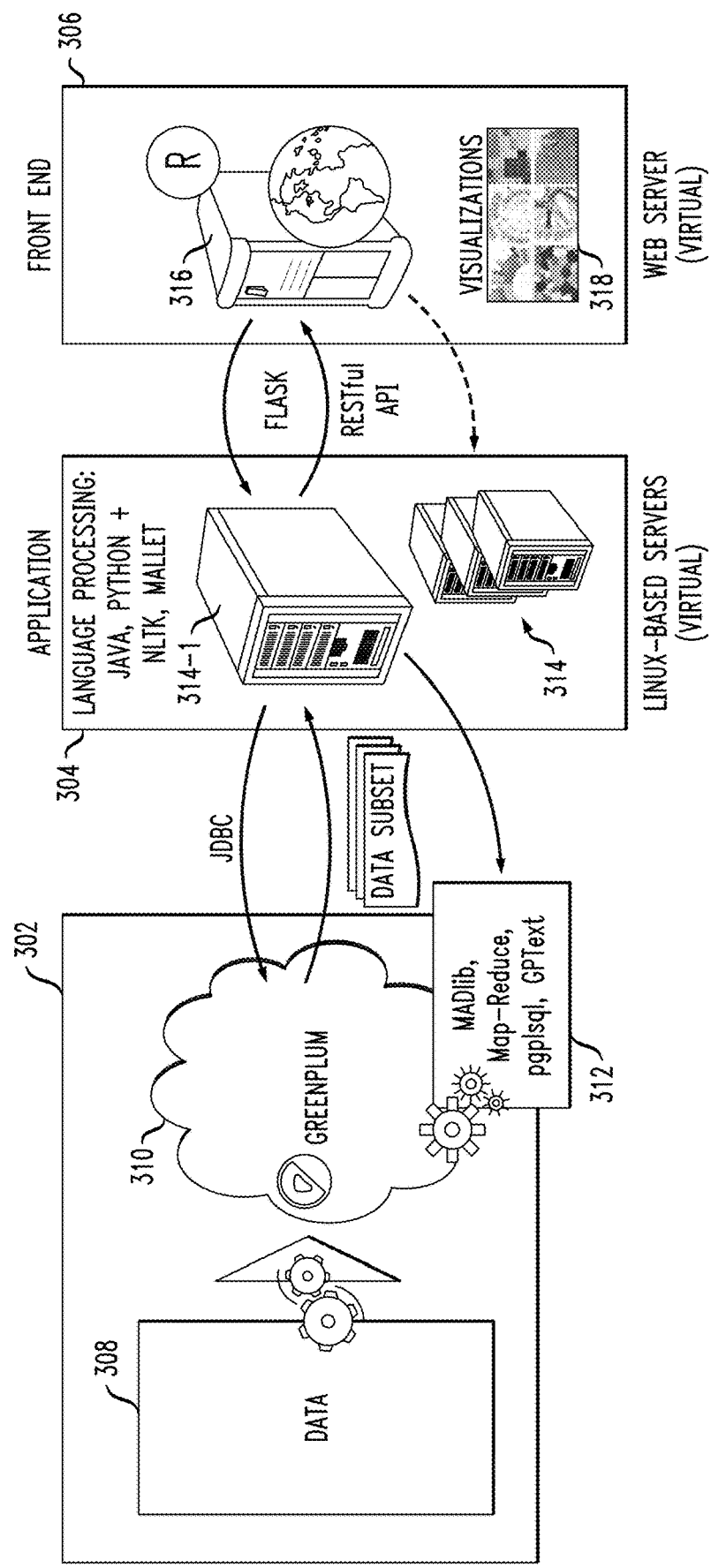
FIG. 3 shows another illustrative embodiment of an information processing system configured to include a machine learning system for automated classification of documents comprising text data of at least one database.

FIG. 3 shows another example of an information processing system 300 that implements a machine learning system in an illustrative embodiment. The system 300 comprises a data layer portion 302, an application portion 304 and a front end portion 306. The data layer portion 302 comprises data 308 that is processed by an analytics system 310 illustratively implemented as a Greenplum® system. Additional functional elements 312 illustratively include a plurality of elements for implementing respective MADlib, Map-Reduce, pgplsql and GPText functionality. These elements interact with the analytics system 310 with input from the application portion 304.

The application portion 304 comprises a set of Linux-based servers 314 illustratively implemented using virtual machines. These include a Linux-based server 314-1 that performs language processing using Java, Python Natural Language Toolkit (NLTK) and Mallet. The server 314-1 interacts with the analytics system 310 via Java DataBase Connectivity (JDBC) and receives data subsets therefrom as illustrated.

The front end portion 306 comprises a web server 316 also illustratively implemented using one or more virtual machines. The front end portion 306 further includes a user interface 318 providing visualizations of the type described elsewhere herein. The web server 316 communicates with the server 314-1 via Flask and a RESTful API as illustrated, and may additionally or alternatively communicate with one or more other servers 314 of the application portion 304 via additional connections shown by a dashed arrow in the figure.

The various portions of system 300 are adapted in the present embodiment to implement the functionality of a machine learning system similar to the machine learning system 104 as previously described.

The machine learning system in the FIG. 3 embodiment more particularly comprises a back end portion that corresponds to the data layer portion 302 and a front end portion that corresponds to the front end portion 304. In such an arrangement, the back end portion of the machine learning system comprises a big data analytics system, illustratively implemented as a massively parallel processing (MPP) database having an associated library of scalable in-database analytics functions. More particularly, the MPP database illustratively comprises the Greenplum® system 310 and its associated library of scalable in-database analytics functions is provided by MADlib element 312. These elements are utilized to implement at least a portion of the machine learning functionality of the machine learning system. The front end portion of the machine learning system interacts with the big data analytics system of the back end portion via the application portion 304. This interaction involves utilization of a standardized database connectivity protocol, such as the above-noted JDBC protocol, as well as Flask and the RESTful API. As indicated previously, the front end portion illustratively comprises a web server implemented utilizing at least one virtual machine.

Again, this particular system configuration is only an example, and numerous other arrangements of system components can be used to provide machine learning functionality. Also, other machine learning systems disclosed herein can be implemented using front end and back end portions configured as illustrated in FIG. 3.

Additional illustrative embodiments of information processing systems will now be described with reference to FIGS. 4 and 5. Each of these information processing systems comprises a machine learning system for automated classification of documents comprising text data of at least one database.

Figure 4:
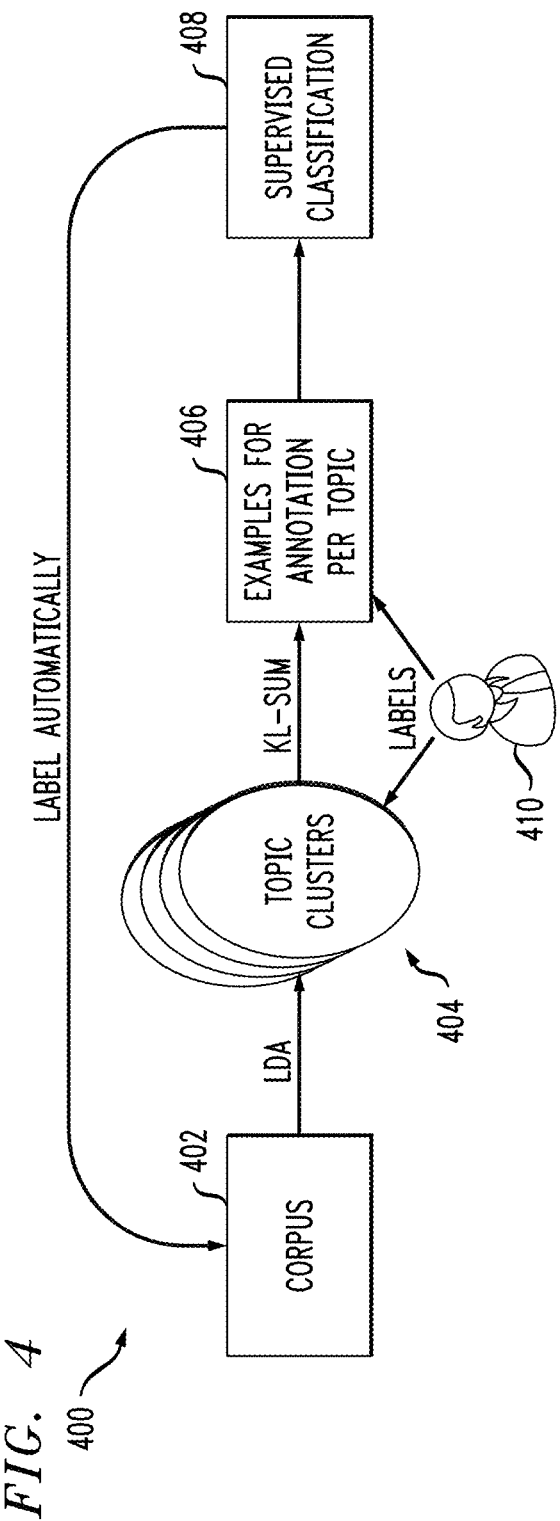
FIGS. 4 and 5 are diagrams illustrating information processing systems with machine learning based automated document classification functionality in illustrative embodiments.

Referring now to FIG. 4, an information processing system 400 comprises a corpus 402 of documents that include text data. The corpus 402 is illustratively part of a database, possibly implemented in the form of a data lake or other type of big data repository. At least a portion of the corpus 402 is processed using an LDA topic modeling approach to generate topic clusters 404. The clusters 404 each comprise one or more documents from the corpus 402 that are associated with the corresponding topic as determined using a topic model. Each such topic may comprise, for example, a set of related terms as determined from the text data of the corpus 402 using the topic model.

From the topic clusters 404, the system 400 selects a set of examples 406 for annotation per topic. This selection illustratively uses a statistical summarization algorithm of the type mentioned previously herein, and more particularly a KL-Sum summarization algorithm, although other automatic summarization algorithms such as SumBasic, BayesSum and Classy can be used in other embodiments. The examples may comprise example sentences that are automatically generated from the text data as previously described.

The system 400 further comprises a supervised classification process 408 that operates on the selected examples 406 in accordance with feedback provided by a system user 410, illustratively an analyst or SME in the particular field that encompasses the documents of the corpus 402. The analyst or SME in other embodiments can be replaced with another type of system user. Outputs of the supervised classification process 408 are utilized to refine an automatic unsupervised classification process which automatically assigns labels to particular clusters of documents from the corpus 402.

In the FIG. 4 embodiment, the system user 410 is able to assign labels to one or more of the clusters 404 corresponding to respective topics. Such an arrangement utilizes a labeling interface analogous to the labeling interface 122 of the FIG. 1 embodiment.

Also, the system user 410 provides feedback regarding the examples 406 selected for annotation per topic. These examples may be viewed as particular document portions that are presented via a supervised tuning interface to the system user 410. The user can provide feedback regarding applicability of the corresponding topic to each of one or more of the presented examples on an individual or per-example basis. The feedback in this embodiment is illustratively in the form of labels for one or more of the examples, although numerous other types of feedback can be used in other embodiments. The tuning interface for presenting such feedback in conjunction with annotation of the examples 406 per topic is referred to herein as a "supervised" tuning interface in that the examples are selected by the system for presentation to the system user 410 in a controlled manner, in this case using the KL-Sum summarization algorithm to select the examples 406 and the supervised classification process 408 to assign labels.

The feedback provided by the system user 410 via the tuning interface is utilized by the supervised classification process 408 to update the topic model. The topic model is used in a clustering process of the type previously described in conjunction with FIGS. 1 and 2 for automatic labeling of topic clusters.

Accordingly, the system user 410 can observe the effect of his or her feedback on the supervised classification process 408 in order to determine if the feedback is producing the desired results. The supervised classification process 408 can utilize any of a variety of different types of supervised machine learning, such as support vector machine (SVM), logistic regression, naïve Bayes, etc. After the topic model has reached a point where the system user is satisfied with the automatically assigned labels, it can be used in an unsupervised classification process for new documents. The supervised tuning by an analyst, SME or other system user via the supervised tuning interface can be repeated periodically or otherwise as needed.

The system 400 and other information processing systems disclosed herein can utilize techniques disclosed in one or more of U.S. patent application Ser. No. 14/501,407, filed Sep. 30, 2014 and entitled "Automated Content Inference System for Unstructured Text Data," Ser. No. 14/501,431, filed Sep. 30, 2014 and entitled "Cluster Labeling System for Documents Comprising Unstructured Text Data," and Ser. No. 14/670,810, filed Mar. 27, 2015 and entitled "Analysis and Visualization Tool with Combined Processing of Structured and Unstructured Service Event Data," all of which are commonly assigned herewith and incorporated by reference herein.

For example, the topic clusters 404 in the system 400 can be produced using an unsupervised clustering algorithm of a type disclosed in the above-cited U.S. patent application Ser. No. 14/501,407. One or more such clusters can be assigned labels using cluster labeling techniques of the type disclosed in the above-cited U.S. patent application Ser. No. 14/501,431. The system user 410 can explore the clustered data using visualizations of the type disclosed in the above-cited U.S. patent application Ser. No. 14/670,810. It is to be appreciated, however, that the techniques disclosed in these related applications are exemplary only, and need not be utilized in other embodiments of the present invention.

Figure 5:
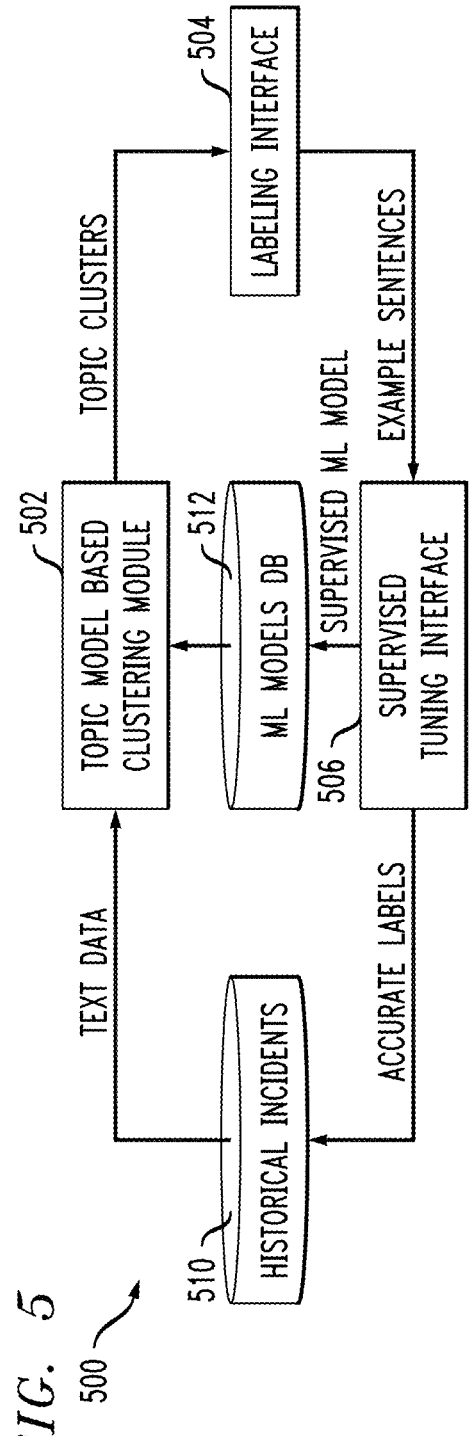

FIG. 5 shows another information processing system 500 which comprises a machine learning system for automated classification of documents comprising text data of at least one database. The system 500 includes a topic model based clustering module 502, a labeling interface 504 and a supervised tuning interface 506. The topic model based clustering module 502 receives text data from a database 510 of historical incidents such as service events. The system further comprises a database 512 of machine learning ("ML") models. These ML models include at least one supervised ML model configured at least in part to process feedback provided via the supervised tuning interface 506.

In operation, the topic model based clustering module 502 processes the text data received from the historical incidents database 510 to generate topic clusters that are provided to the labeling interface 504. Using the labeling interface 504, labels are assigned to the topic clusters by a system user, such as an analyst or SME. Example sentences are then selected from the documents of the topic clusters. The generation of example sentences is illustratively performed automatically by breaking down the text data of the documents into sentences. The supervised tuning interface 506 is utilized to collect feedback from the analyst, SME or other system user regarding the example sentences. The feedback provided via the supervised tuning interface is used in accordance with a supervised ML model from the database 512 of ML models to update at least one of the topic models used by the topic model based clustering module 502 to form the topic clusters supplied to labeling interface 504.

As indicated previously, examples of user interface displays generated by a machine learning system in illustrative embodiments will now be described with reference to FIGS. 6 through 8.

Figure 6:
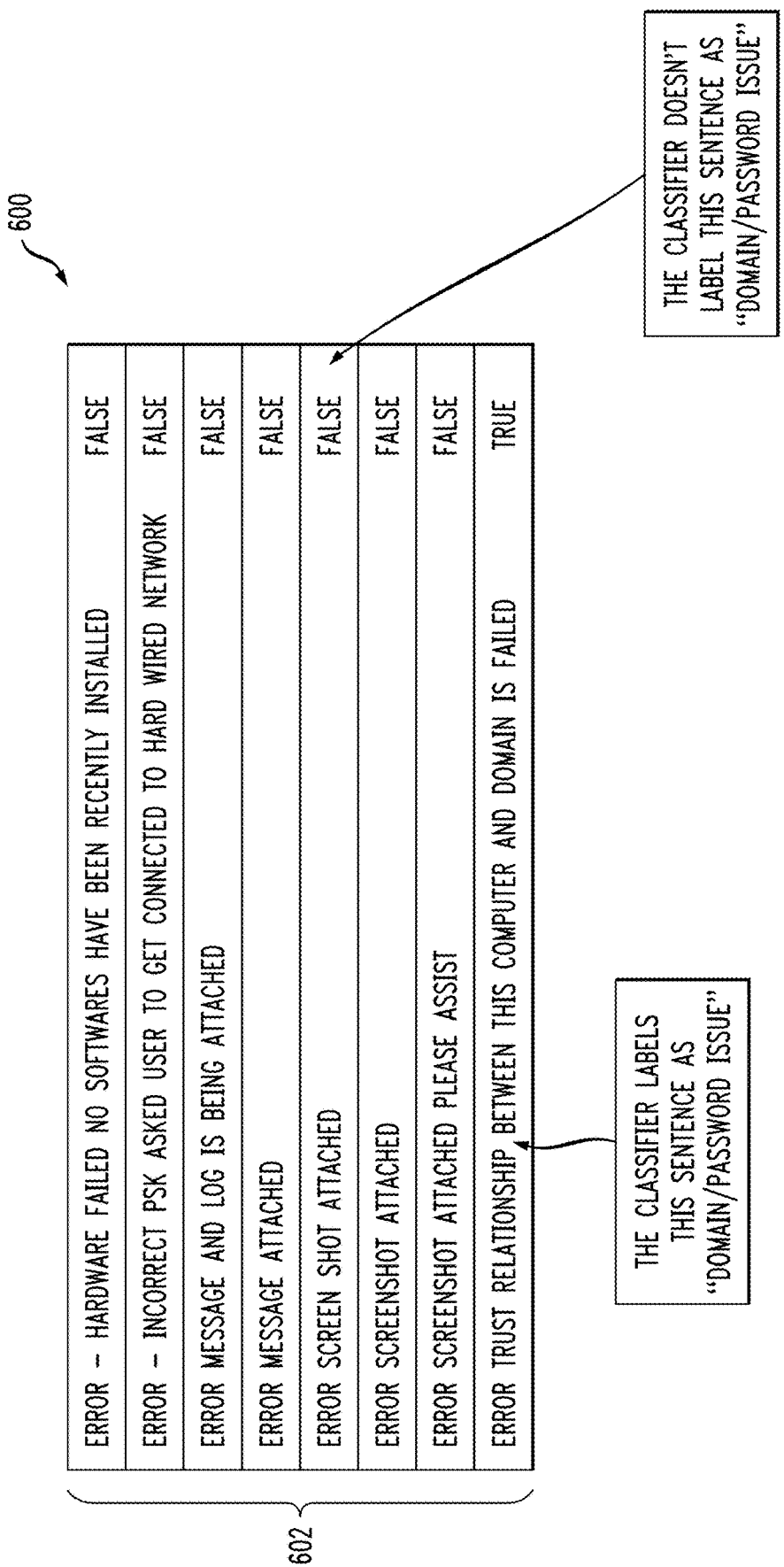

Referring initially to FIG. 6, an exemplary user interface display 600 generated by the machine learning system 104 is shown. The user interface display 600 is assumed to be one of a plurality of different user interface displays that are generated by the machine learning system 104. These and other user interface displays shown herein are more particularly generated as part of the supervised tuning interface 124 and may in some instances utilize one or more visualizations generated by view generators 134 of the visualization module 126.

As shown in the figure, the user interface display 600 presents a plurality of example sentences 602 for a given topic cluster. The topic cluster in this embodiment is labeled as "domain/password issue." Such a label may have been assigned automatically by the system, or may have been assigned by a system user through a labeling interface. The example sentences 602 are presented for this topic cluster. The system user provides feedback via the supervised tuning interface in this embodiment by indicating for each of the example sentences whether or not the example sentence should actually be associated with the corresponding topic. Sentences that are indicated as "false" are false positives and therefore are not labeled by a supervised classifier implementing a supervised classification process as being part of the topic cluster "domain/password issue." On the other hand, sentences that are indicated as "true" are true positives and therefore are labeled by the supervised classifier as being part of the topic cluster "domain/password issue."

The example sentences 602 presented in the user interface display 600 are illustrations of what are more generally referred to herein as "portions of documents" assigned to a particular one of the clusters by a clustering module. Other types of document portions can be used in other embodiments, such as bigrams corresponding to respective pairs of words, and numerous other arrangements of words, phrases or sentences, in any combination. The user interface display 600 is part of a supervised tuning interface of a machine learning system that permits a system user to provide feedback regarding applicability of the corresponding topic to each of the presented portions on a per-portion basis.

In the FIG. 6 embodiment, the user interface display 600 permits the user to select a particular confidence level for the applicability of the topic to a given one of the presented portions, in this case a particular example sentence. The confidence level in this embodiment is binary in that the user can select only "true" or "false" although other arrangements of multiple selectable confidence levels can be used in other embodiments.

Other embodiments of user interface displays that are part of a supervised tuning interface of a machine learning system are shown in FIGS. 7 and 8.

Referring now to FIG. 7, a user interface display 700 at the left side thereof provides a drop-down menu that allows a system user to select a particular one of a plurality of topics, in this case "domain/password," and then to control the loading of representative sentences for that selected topic by activation of a "load sentences" control button. The representative sentences are then presented at the right side of the user interface display 700.

For each of the representative sentences presented at the right side of the user interface display 700, the user can select one of a number of different confidence levels, which in this embodiment include a confidence level denoting that the user is "not sure" that the particular sentence should be associated with the selected "domain/password" topic. Other confidence levels may also be selectable by the user, including "true" or "false" confidence levels of the type described in conjunction with FIG. 6, although such confidence levels are not explicitly shown in FIG. 7.

It is also possible in this embodiment for the user to select an alternative topic for a given one of the representative sentences. For example, for two of the representative sentences in the FIG. 7 embodiment, the user has selected an alternative topic, illustratively having topic number 6, denoted "network connectivity." The selection of confidence levels and alternative topics in this embodiment is implemented using drop-down menus which are presented adjacent respective ones of the representative sentences at the right side of the user interface display 700.

Additional controls provided at the left side of the user interface display 700 include a "submit corrections" control button and a "review tuning result" control button. The "submit corrections" control button submits to the supervised classifier the confidence level selections and alternative topic selections made by the user via the drop-down menus at the right side of the user interface display 700. The "review tuning result" allows the user to see an updated set of representative sentences that are now associated with the selected topic after updating of the topic model to reflect the supervised tuning.

The user interface display 800 of FIG. 8 is configured in a manner similar to that previously described for user interface display 700, but in this case the user has selected the topic of "drive replacement" and for certain presented representative sentences has selected alternative topics, illustratively having topic numbers 0, 5 and 7, denoted "administrative," "health check" and "non drive hw replacement," respectively. As in the FIG. 7 embodiment, selection of alternative topics for a given representative sentence is made from a drop-down menu presented adjacent that representative sentence at the right side of the user interface display. Alternative techniques can be used in other embodiments to provide a listing of selectable alternative topics provided for the presented representative sentence.

It should be understood that the particular user interface displays illustrated in FIGS. 6 through 8 are presented by way of example only, and should not be construed as limiting the scope or functionality of the machine learning system 104 in any way. For example, alternative displays can be utilized in implementing a supervised tuning interface of a machine learning system in other embodiments.

As mentioned previously, the system embodiments of FIGS. 1 and 3-5 are presented by way of example only. Numerous other configurations and arrangements of components can be used to implement a machine learning system for automated classification of documents comprising text data.

The illustrative embodiments provide a number of significant advantages relative to conventional arrangements. For example, some embodiments provide particularly accurate and efficient clustering of documents comprising text data through the use of a machine learning system in which topic model based clustering is facilitated by supervised classification using feedback provided via a supervised tuning interface.

As indicated previously, the machine learning systems in some embodiments are data driven in that relevant topics are elevated automatically from actual unstructured text data itself rather than determined by attempting to impose a limited set of predefined themes on the unstructured text data.

The illustrative embodiments can therefore advantageously avoid the need for manual screening in which a corpus of unstructured text data is reviewed and sampled by service personnel.

Furthermore, there is no need for manual customization and maintenance of a large set of rules that can be used to determine correspondence with predefined themes of interest. For example, the illustrative embodiments do not require rule updates to accommodate previously unseen terms appearing in unstructured text data.

It is to be appreciated that the foregoing advantages are illustrative of advantages provided in certain embodiments, and need not be present in other embodiments.

It was noted above that portions of the information processing system 100 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 100, these processing platforms may also be used to implement at least portions of other information processing systems in other embodiments of the invention, such as the information processing systems 300, 400 and 500 of FIGS. 3, 4 and 5, respectively.

Figure 9:
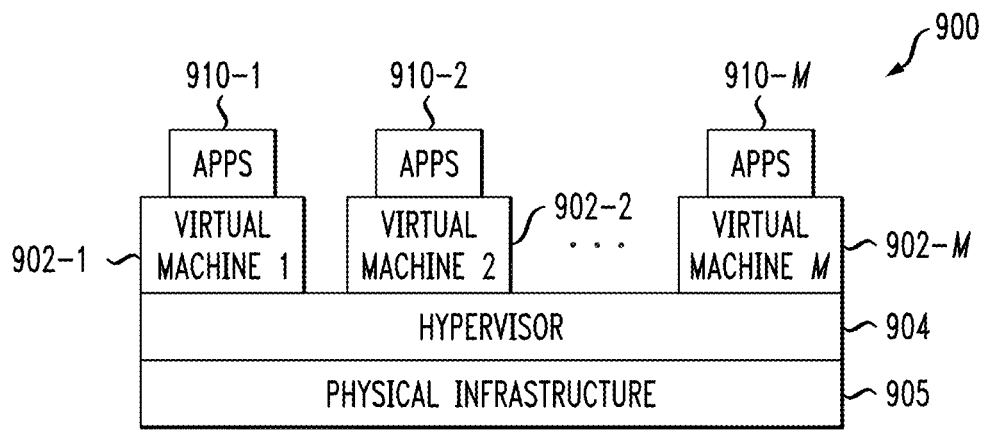
FIGS. 9 and 10 show examples of processing platforms that may be utilized to implement at least a portion of one or more of the information processing systems of FIGS. 1 and 3-5.

As shown in FIG. 9, portions of the information processing system 100 may comprise cloud infrastructure 900. The cloud infrastructure 900 comprises virtual machines (VMs) 902-1, 902-2, . . . 902-M implemented using a hypervisor 904. The hypervisor 904 runs on physical infrastructure 905. The cloud infrastructure 900 further comprises sets of applications 910-1, 910-2, . . . 910-M running on respective ones of the virtual machines 902-1, 902-2, . . . 902-M under the control of the hypervisor 904.

Although only a single hypervisor 904 is shown in the embodiment of FIG. 9, the system 100 may of course include multiple hypervisors each providing a set of virtual machines using at least one underlying physical machine. For example, different sets of virtual machines provided by respective ones of multiple hypervisors may be utilized in configuring multiple instances of clustering module 120, interfaces 122 and 124, visualization module 126 or other components of the system 100.

An example of a commercially available hypervisor platform that may be used to implement hypervisor 904 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

The cloud infrastructure 900 in FIG. 9 can additionally or alternatively be implemented using other types of virtualization techniques, such as Docker containers or other types of containers.

Figure 10:
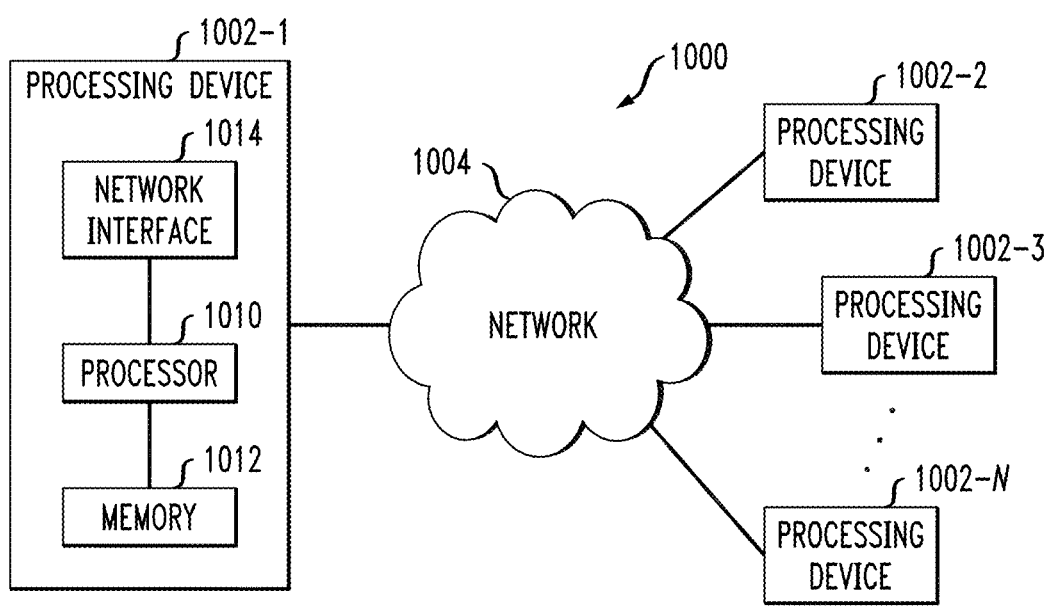

Another example of a processing platform suitable for use in some embodiments is processing platform 1000 shown in FIG. 10. The processing platform 1000 in this embodiment is assumed to comprise at least a portion of system 100 and includes a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an ASIC, an FPGA, or other type of processing circuitry, as well as portions or combinations of such circuitry elements.

The memory 1012 may comprise RAM, ROM or other types of memory, in any combination. As mentioned previously, the memory 1012 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform configured to implement a machine learning system for automated classification of documents comprising text data of at least one database;
wherein the machine learning system comprises:
first program code that when executed by the processing platform implements a clustering module configured to assign each of the documents to one or more of a plurality of clusters corresponding to respective topics identified from the text data in accordance with at least one topic model; and
second program code that when executed by the processing platform selects example portions of given documents from the plurality of clusters and further implements an interface configured to present the example portions of the given documents, and to receive feedback regarding applicability of the corresponding topic to each of one or more of the example portions on a per-portion basis;
wherein the machine learning system is configured to generate said at least one topic model by automatically elevating the topics from the text data as respective sets of related terms;
wherein said at least one topic model is updated based at least in part on the received feedback;
wherein the text data comprises unstructured text data;
wherein the unstructured text data comprises unstructured service event data of a service events database and wherein the unstructured service event data comprises unstructured service request summaries including one or more problem summaries and one or more corresponding solution summaries;
wherein at least a portion of the first program code that when executed by the processing platform implements the clustering module comprises program code that when executed by the processing platform implements a topic model generator configured to generate the at least one topic model and wherein the feedback received via the interface is supplied to the topic model generator to update the at least one topic model such that additional documents are each automatically assigned to one or more of the plurality of clusters utilizing the updated at least one topic model; and
wherein the processing platform comprises one or more processing devices each comprising a processor coupled to a memory.

2. The apparatus of claim 1 wherein the machine learning system further comprises an additional interface permitting entry of labels for respective ones of the clusters corresponding to respective topics.

3. The apparatus of claim 1 wherein the machine learning system comprises:
a back end portion; and
a front end portion coupled to the back end portion;
the back end portion comprising a big data analytics system implementing machine learning functionality of the machine learning system including at least part of the clustering module;
the front end portion implementing at least part of the interface.

4. The apparatus of claim 3 wherein the big data analytics system of the back end portion comprises a massively parallel processing (MPP) database having an associated library of scalable in-database analytics functions and wherein the front end portion comprises a web server implemented utilizing at least one virtual machine.

5. The apparatus of claim 1 wherein said at least one database is updated to indicate the assignment of a given one of the documents to one or more of the clusters.

6. The apparatus of claim 1 wherein the topic model generator provides lists of topics at least a subset of which are elevated as respective sets of related terms from the text data.

7. The apparatus of claim 6 wherein the topic model generator is configured to implement latent Dirichlet allocation (LDA).

8. The apparatus of claim 1 wherein at least a subset of the example portions presented via the interface comprise respective sentences.

9. The apparatus of claim 1 wherein the interface is configured to permit selection of a particular confidence level for the applicability of the topic to a given one of the example portions.

10. The apparatus of claim 1 wherein the interface is configured to permit selection of an alternative topic for a given one of the example portions and wherein the assignment of the associated document to one or more clusters is adjusted by the clustering module in accordance with the selection of the alternative topic, the alternative topic being selected from a listing of a plurality of selectable alternative topics provided for the presented portion by the interface.

11. An information processing system comprising the apparatus of claim 1.

12. A method comprising:
obtaining documents comprising text data of at least one database;
assigning each of the documents to one or more of a plurality of clusters corresponding to respective topics identified from the text data in accordance with at least one topic model in which the topics are automatically elevated from the text data as respective sets of related terms;
selecting example portions of given documents from the plurality of clusters;
presenting via an interface the example portions of the given documents;
receiving via the interface feedback regarding applicability of the corresponding topic to each of one or more of the example portions on a per-portion basis; and
updating said at least one topic model based at least in part on the received feedback;
wherein the text data comprises unstructured text data;
wherein the unstructured text data comprises unstructured service event data of a service events database and wherein the unstructured service event data comprises unstructured service request summaries including one or more problem summaries and one or more corresponding solution summaries;
wherein the feedback received via the interface is utilized to update the at least one topic model such that additional documents are each automatically assigned to one or more of the plurality of clusters utilizing the updated at least one topic model; and wherein said obtaining, assigning, selecting, presenting, receiving and updating are performed by a processing platform comprising one or more processing devices.

13. The method of claim 12 further comprising permitting selection via the interface of a particular confidence level for the applicability of the topic to a given one of the example portions.

14. The method of claim 12 further comprising:

permitting selection via the interface of an alternative topic for a given one of the example portions; and adjusting the assignment of the associated document to one or more clusters in accordance with the selection of the alternative topic.

15. The method of claim 14 wherein permitting selection via the interface of an alternative topic comprises permitting selection of the alternative topic from a listing of a plurality of selectable alternative topics provided for the given one of the example portions by the interface.

16. A non-transitory processor-readable storage medium having program code of one or more software programs embodied therein, wherein the program code when executed by at least one processing device of a processing platform causes the processing device:

to obtain documents comprising text data of at least one database;

to assign each of the documents to one or more of a plurality of clusters corresponding to respective topics identified from the text data in accordance with at least one topic model in which the topics are automatically elevated from the text data as respective sets of related terms;

to select a set of example portions of given documents from the plurality of clusters;

to present via an interface the example portions of the given documents;

to receive via the interface feedback regarding applicability of the corresponding topic to each of one or more of the example portions on a per-portion basis; and to update said at least one topic model based at least in part on the received feedback;

wherein the text data comprises unstructured text data;

wherein the unstructured text data comprises unstructured service event data of a service events database and wherein the unstructured service event data comprises unstructured service request summaries including one or more problem summaries and one or more corresponding solution summaries; and wherein the feedback received via the interface is utilized to update the at least one topic model such that additional documents are each automatically assigned to one or more of the plurality of clusters utilizing the updated at least one topic model.

17. The processor-readable storage medium of claim 16 wherein the program code when executed by at least one processing device further causes said processing device:

to permit selection via the interface of an alternative topic for a given one of the example portions; and to adjust the assignment of the associated document to one or more clusters in accordance with the selection of the alternative topic.

18. The processor-readable storage medium of claim 16 wherein the program code when executed by at least one processing device further causes said processing device to provide an additional interface permitting entry of labels for respective ones of the clusters corresponding to respective topics.

19. The processor-readable storage medium of claim 16 wherein at least a subset of the example portions presented via the interface comprise respective sentences.

20. The processor-readable storage medium of claim 16 wherein the interface is configured to permit selection of a particular confidence level for the applicability of the topic to a given one of the example portions.

* * * * *